United States Patent [19]

Takeuchi

[11] Patent Number: 5,368,249
[45] Date of Patent: Nov. 29, 1994

[54] HANDLE COLLAPSING MECHANISM FOR FISHING REEL

[75] Inventor: Shinji Takeuchi, Tokyo, Japan
[73] Assignee: Daiwa Seiko, Inc., Tokyo, Japan
[21] Appl. No.: 88,366
[22] Filed: Jul. 9, 1993

[30] Foreign Application Priority Data

Jul. 10, 1992 [JP] Japan ............... 4-054220[U]

[51] Int. Cl.⁵ .................................. A01K 89/01
[52] U.S. Cl. ............................. 242/284; 74/547
[58] Field of Search ................ 242/284; 74/546, 547

[56] References Cited

U.S. PATENT DOCUMENTS

| | | | |
|---|---|---|---|
| 1,191,855 | 7/1916 | Tuszka | 74/547 |
| 3,948,117 | 4/1976 | Kimura | 74/547 |
| 4,524,921 | 6/1985 | Ozaki et al. | 242/284 |
| 4,552,034 | 11/1985 | Bertani et al. | 74/547 |

FOREIGN PATENT DOCUMENTS

| | | | |
|---|---|---|---|
| 255469 | 4/1988 | Germany | 242/284 |
| 3-75124 | 11/1991 | Japan . | |
| 4-1804 | 1/1992 | Japan . | |

*Primary Examiner*—Daniel P. Stodola
*Assistant Examiner*—Michael R. Mansen
*Attorney, Agent, or Firm*—Longacre & White

[57] ABSTRACT

A mechanism which for collapsing a handle of fishing reel to its side perpendicularly intersecting a plane containing the axis of the handle and that of a handle shaft. A manipulation member (15) having a manipulating projection (14) constituting the inner end of the member is fitted in the hole (11) of the shaft portion of the handle (4). The shaft portion has an engagement hole (12) provided between the inner end of the hole (11) and the deep-grooved inner part (5) of the shaft portion. The jut (2) of a holder (3) is fitted in the deep-grooved inner part (5) so that the handle (4) is supported. An engagement member (9) is fitted in the hole (7) of the jut (2) so that the engagement end portion (8) of the member can be engaged in the engagement hole (12) and disengaged out of it. To collapse handle (4), the manipulation member (15) is pushed in to disengage the engagement end portion (8) out of the engagement hole (12). A projecting member can be dispensed with at the joint of the handle and the shaft, thereby making the mechanism compact at the joint and prevent a fishline from tangling on the member.

4 Claims, 4 Drawing Sheets 5,368,249

1

HANDLE COLLAPSING MECHANISM FOR FISHING REEL

BACKGROUND OF THE INVENTION

The present device relates to an improved mechanism for collapsing the handle of a fishing reel.

When the handle of a conventional spinning reel for fishing is collapsed for carrying, packing or the like, the handle is swung inward to the side of the reel, which perpendicularly intersects a plane containing the axis of the handle and that of a handle shaft, as disclosed in the Japanese Patent Application No. 75124/91, the Japanese Utility Model Application No. 1804/92 or the like.

Since the conventional spinning reel has a stopper projecting at the handle, there are problems that the joint of the handle and the handle shaft is bulky to make it difficult to reduce the size and weight of the reel, and a fishline is likely to tangle on the stopper.

SUMMARY OF THE INVENTION

The present device was made in order to solve the above-mentioned problems. Accordingly, it is an object of the device to provide a mechanism which is for collapsing the handle of a fishing reel and is enhanced in packing and carrying properties.

In the mechanism, a holder is provided on a handle shaft at the end thereof, and has a jut fitted in the deep-grooved inner part of the shaft portion of the handle so that the handle is supported and can be swung to be collapsed. An engagement member is fitted in the jut at the tip thereof and urged so that the tip of the member can be moved into and out of the jut. A manipulation member has a manipulating projection extending toward the handle shaft, and is fitted in the hole of the shaft portion of the handle. The shaft portion has an engagement hole provided between the inner end of the former hole and the deep-grooved inner part so that the tip of the engagement member is engaged in the latter hole, and the manipulating projection can be inserted into the latter hole to put the tip of the engagement member out of the latter hole. A flexible cover capable of the being pressed on the manipulation member to put it in may be provided in the former hole at the outer end thereof in order to enhance the water and dust entry preventing properties of the mechanism.

To collapse the handle by the mechanism proved in accordance with the present device, the manipulation member is pushed in by a finger to put the tip of the engagement member out of the engagement hole of the shaft portion of the handle through the manipulating projection of the manipulation member, and the handle is then swung inward to the side of the fishing reel about the handle support point of the deep-grooved inner part of the handle. To undo the collapsing of the handle, it is swung outward from the side of the reel while the inner surface of the deep-grooved inner part slides in pressure contact with the tip of the engagement member so that the tip is engaged in the engagement hole of the handle to properly couple it to the handle shaft to make it possible to wind a fishline on the reel by turning the handle to rotate the handle shaft.

BRIEF DESCRIPTION OF THE DRAWINGS

In the accompanying drawings:

2

Figure 1:
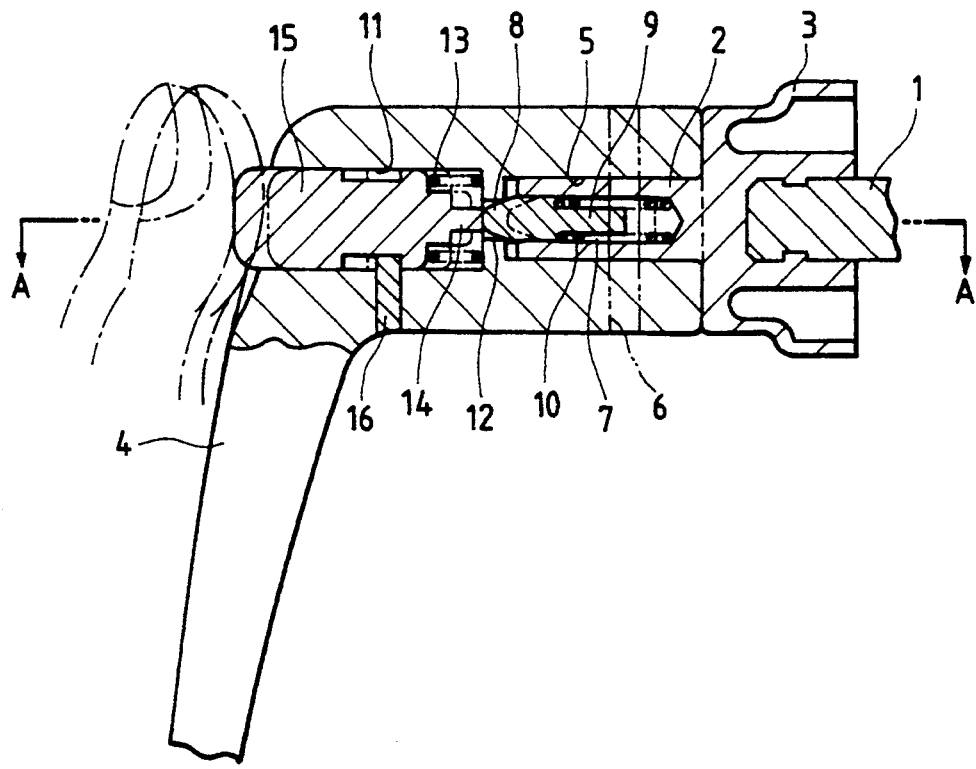
Figure 2:
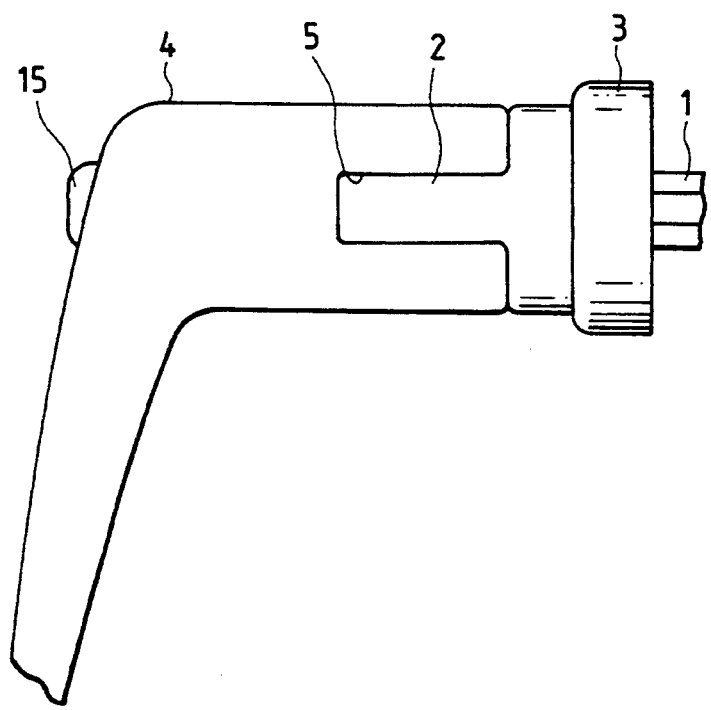
Figure 3:
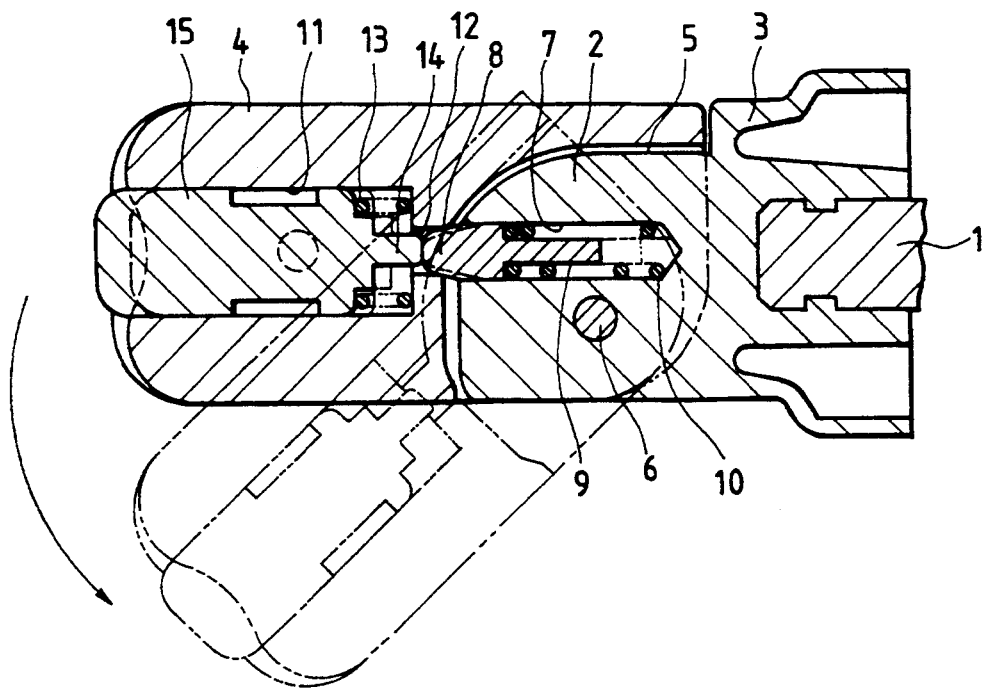
Figure 4:
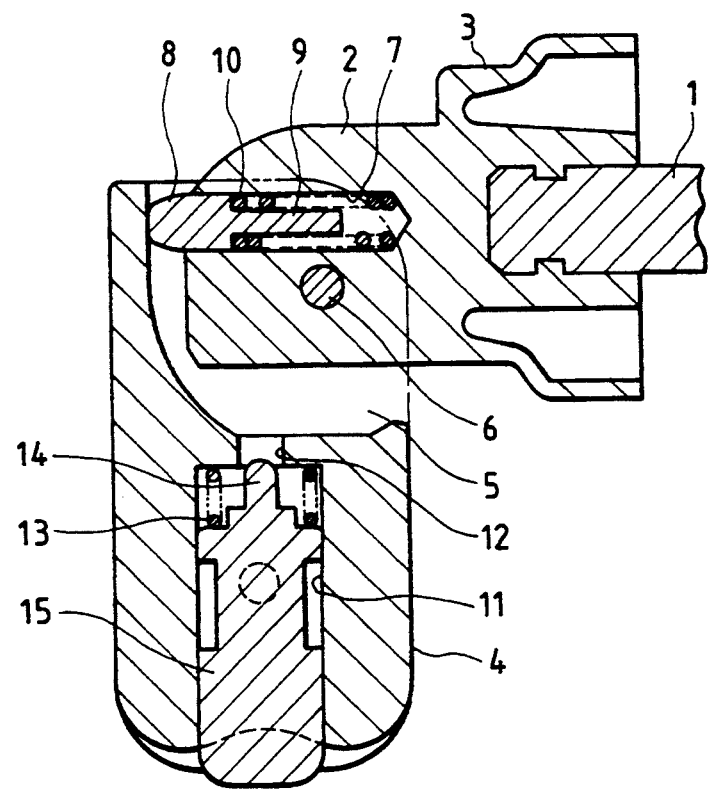
Figure 5:
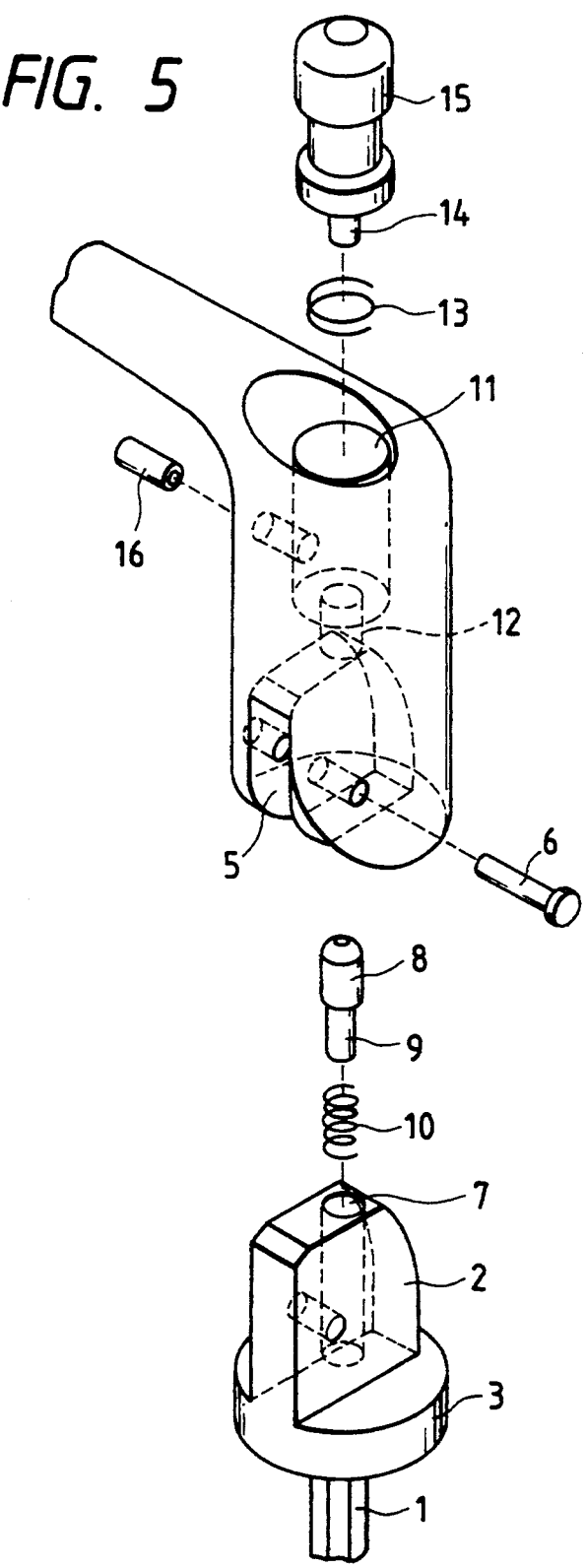
Figure 6:
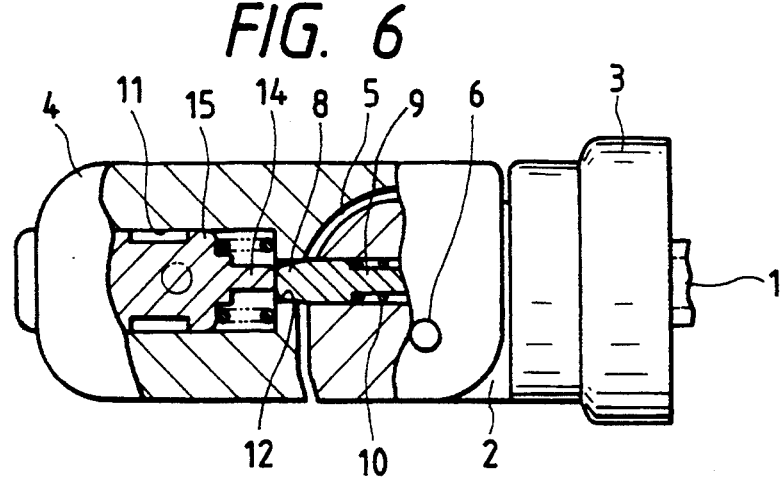
Figure 7:
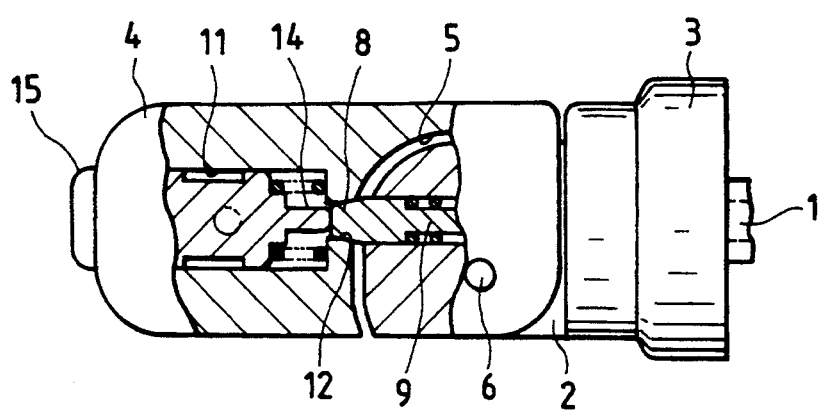
Figure 8:
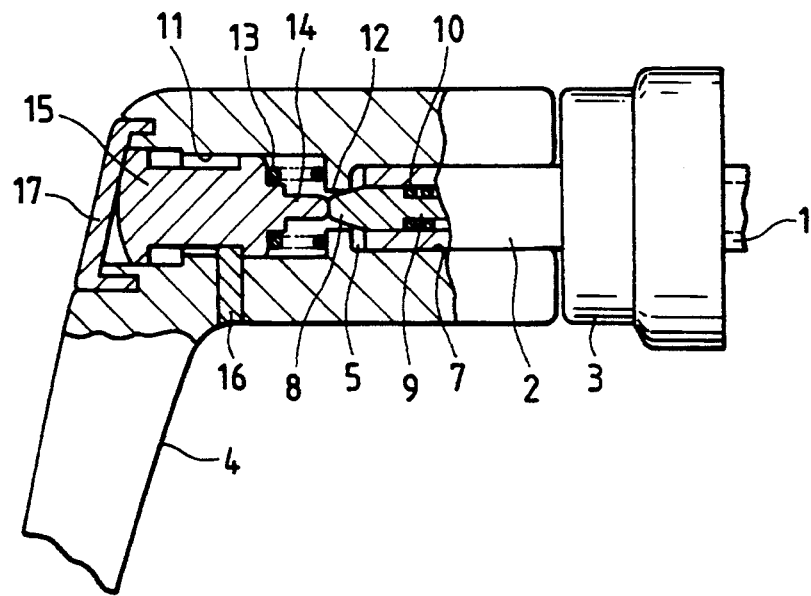

FIG. 1 is a cutaway front view of a handle collapsing mechanism which is an embodiment of the present device;

FIG. 2 is a front view of the mechanism;

FIG. 3 is a sectional view of the mechanism along lines A—A shown in FIG. 1;

FIG. 4 is a sectional view of the mechanism in the state that the handle of a fishing reel is collapsed;

FIG. 5 is an exploded perspective view of a major part of the mechanism;

FIG. 6 is a cutaway plan view of a handle collapsing mechanism which is a modification of the embodiment;

FIG. 7 is a cutaway plan view of a handle collapsing mechanism which is another modification of the embodiment; and FIG. 8 is a cutaway front view of a handle collapsing mechanism which is yet another modification of the embodiment.

DETAILED DESCRIPTION OF THE PREFERRED EMBODIMENTS

An embodiment of the present device is hereafter described with reference to the drawings attached hereto.

FIGS. 1, 2, 3, 4 and 5 show a mechanism which is the embodiment and is for collapsing the handle of a spinning reel for fishing. The reel includes a handle shaft 1, and the handle 4 coupled thereto. The mechanism includes a holder 3, the shaft portion of the handle 4, a coupling pin 6, and engagement member 9, a spring 10, a spring 13, a manipulation member 15, and an engagement pin 16.

The holder 3 has a jut 2 extending outward, and is secured to the handle shaft 1 at the outer end thereof. The jut 2 is fitted in the deep-grooved inner part 5 of the shaft portion of the handle 4. The coupling pin 6 is fitted in the jut 2 and the part 5 so that the handle 4 is supported with the holder, and can be collapsed by being swung to the side of the reel about the pin.

The engagement member 9 has an engagement end portion 8, and is fitted in the hole 7 of the outer portion of the jut 2 and urged by the spring 10 so that the member can be moved inward and outward relative to the hole. The outer part of the shaft portion of the handle 4 has a hole 11 extending toward the handle shaft 1, and has an engagement hole 12 provided between the former hole 11 and the deep groove of the inner part 6 of the shaft portion and communicating with the hole and the groove. When the handle 4 is attached to the holder 3, the engagement end portion 8 of the engagement member 9 is engaged in the engagement hole 12 to properly couple the handle to the handle shaft 1 to make it possible to wind a fishline on the reel by turning the handle to rotate the shaft.

The manipulation member 15 has a manipulating projection 14 constituting the inner end of the member, and is fitted in the hole 11 of the outer part of the shaft portion of the handle 4. The outer end portion of the member 15 is smooth and substantially column-like shape so that the fishline does not tangles on that portion. The spring 13 is provided between the manipulation member 15 and the inner surface of the shaft portion of the handle 4, i.e. the bottom of the hole 11, and urges the member 15 outward so that the outer end portion of the member usually projects out of the hole 11, and the inner end of the member is usually butted to the engagement end portion 8 of the engagement member 9 at the bottom of the hole 11. The engagement pin 16 is fitted in the outer part of the shaft portion of the handle 4 so that the manipulation member 15 is usually engaged with the pin not to be moved out of the hole 11 of the handle by the outward urging force of the spring 13.

When the manipulation member 15 is pushed in by a finger against the urging force of the spring 13 as shown in FIG. 1, the manipulating projection 14 of the member pushes the engagement end portion 8 of the engagement member 9 to put the portion 8 out of the engagement hole 12 to make it possible to collapse the handle 4 by swinging it inward to the side of the reel about the coupling pin 6 as shown in FIGS. 3 and 4. To undo the collapsing of the handle 4, it is swung outward from the side of the reel about the coupling pin 6 while the inner surface of the deep-grooved inner part 5 of the shaft portion of the handle slides in pressure contact with the engagement end portion 8 of the engagement member 9 so that the engagement end portion is finally engaged in the engagement hole 12 of the shaft portion to keep the handle from being collapsed without pushing in the manipulation member 15.

Additionally, the collapsing mechanism of the invention may be arranged so that the outer end of the manipulation member 15 is flush with a surface of the handle 4.

FIG. 6 shows a reel handle collapsing mechanism which is a modification of the embodiment. The difference of the mechanism from the embodiment is that the outside circumferential surface of the engagement end portion 8 of an engagement member 9 extends straight along the axis thereof as well as the engagement hole 12 of a handle 4.

FIG. 7 shows a reel handle collapsing mechanism which is another modification of the embodiment. The difference of the mechanism from the embodiment is that both of an engagement end portion 8 and an engagement hole 12 are tapered.

FIG. 8 shows a reel handle collapsing mechanism which is yet another modification of the embodiment. The difference of the mechanism from the embodiment is that a flexible cover 17 made of rubber or the like is provided in the hole 11 of a handle 4 at the outer end of the hole, and covers a manipulation member 15 to prevent water, sand or the like from entering into the hole, an engagement hole 12 and a hole 7. The water and dust entry preventing properties of the mechanism are thus enhanced. To collapse the handle 4, the cover 17 is pressed inward to push in the manipulation member 15.

Since a handle collapsing mechanism provided for a fishing reel in accordance with the present device does not have a projecting member such as the stopper of the conventional fishing reel at the joint of the handle and handle shaft thereof, the mechanism is reduced in size and weight and a fishline does not tangle on the projecting member. Therefore, the packing and carrying properties of the reel whose handle is collapsed inward to the side of the reel, which perpendicularly intersects a plane containing the axis of the handle and that of a handle shaft, are enhanced. A cover may be provided in the hole of the handle at the outer end of the hole to prevent water, dust or the like from entering into the mechanism. Desirable effects can thus be produced.

What is claimed is:

1. A mechanism for selectively collapsing a handle of a fishing reel in which a deep-grooved part formed in a shaft portion of the handle is fitted on and swingably supported on a jut of a handle shaft so that the handle is permitted to be collapsed from a fishline winding position to a collapsed position, said mechanism comprising:
    a recess portion formed in said shaft portion of said handle;
    an engagement hole portion formed in said shaft portion and communicating said recess portion with said deep-grooved part;
    an engagement member provided in a hole in said jut and provided with a means for urging said engagement member to project from a distal end of said jut and into engagement with said engagement hole portion when said handle is in said fishline winding position;
    a manipulation member movably provided in said recess portion and insertable into said engagement hole portion so as to disengage said engagement member from said engagement hole portion.

2. The mechanism according to the claim 1, further comprising:
    a flexible cover provided on said shaft portion for covering an open end of said recess portion, which is located opposite from said engagement hole portion.

3. The mechanism according to claim 1, wherein said engagement member is automatically pushed into and engaged with said engagement hole portion when said handle is swung from said collapsed portion to said fishline winding position.

4. The mechanism according to claim 1, wherein said manipulation member has a substantially column-like shape and is movable in an axial direction thereof.

* * * * *